March 10, 1936.  C. E. GARDNER  2,033,627
PLANT PACKAGE WATERING DEVICE
Filed Sept. 28, 1935

Inventor
CLARK E. GARDNER

By

Attorney

Patented Mar. 10, 1936

2,033,627

UNITED STATES PATENT OFFICE 2,033,627

PLANT PACKAGE WATERING DEVICE

Clark E. Gardner, Osage, Iowa

Application September 28, 1935, Serial No. 42,700

5 Claims. (Cl. 47—38)

The present invention relates to plant packages and consists in the combinations and arrangements of elements hereinafter described and particularly set forth in the accompanying claims.

The purpose of the invention is to provide a waterproof plant package adapted to be initially wetted, and having incorporated therein a device for conveniently irrigating the same thereafter as required and thereby extending its season for display and sale.

A further purpose of the invention is to provide a plant package of this type which is put up as a compact or self contained unit, of a size convenient for handling, and in which the roots and sustaining material therefor may be conveniently watered at will without wetting the exterior of the package or the exposed foliage of the plant.

The present type of plant packages have the serious defect that after the same have been distributed to retail stores or the like for over the counter trade, or otherwise placed on the market, the roots will in too short a time begin to dry, and also the tops or exposed foliage will wilt and wither, with the consequent result that the packages soon become unsalable and are otherwise useless, resulting in large loss to the nurserymen or others whose investments are involved. To overcome these defects the present invention contemplates the provision of a simple and inexpensive device forming a part of the plant package and by means of which the roots and packing material may be watered in an efficient and convenient manner and thereby the plant kept fresh and in good growing condition over an appreciably long period.

The principle of the invention as herein disclosed is also well adapted for use in connection with plant packages of general type as now put on the market, and a special adaptation of the invention thereto forms the basis of my co-pending application for U. S. Letters Patent filed of even date herewith, entitled: Watering tube device for packaged plants Ser. No. 42,701.

Figure 1:
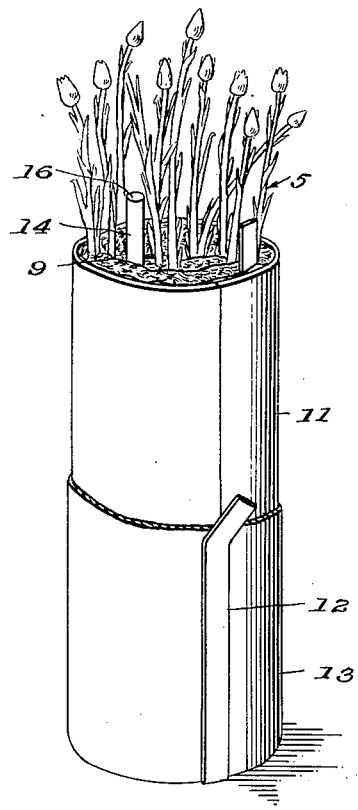

The invention herein is shown by way of illustration in the accompanying drawing wherein:

Figure 1 is a perspective view of the plant package complete and with the device applied thereto.

Figure 2:
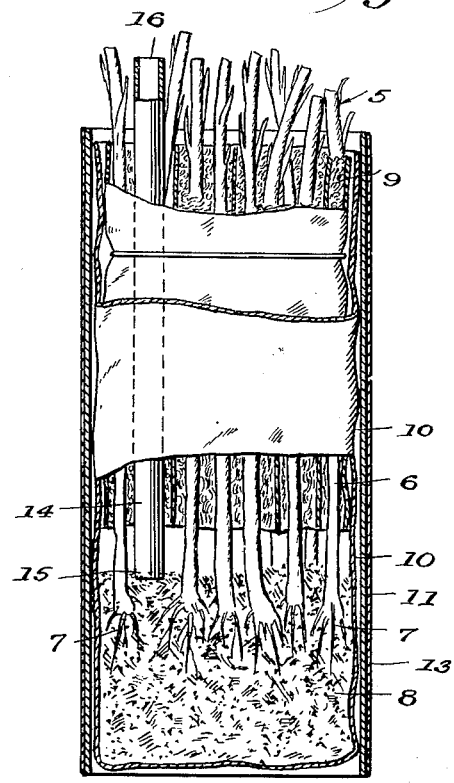

Figure 2 a central sectional view thereof.

Figure 3:
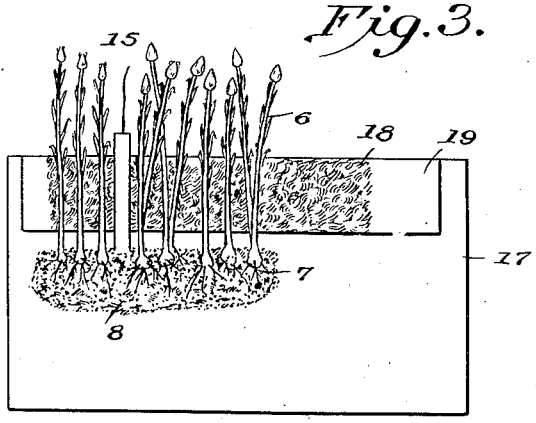
Figure 4:
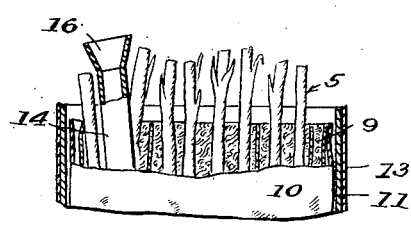

Figure 3 shows an application of the watering device to a different form of plant package and, Figure 4 is a central sectional view of a plant package, in part, showing a modified form of the irrigating tube.

Referring to the construction in further detail and wherein like reference characters designate corresponding parts in the different figures shown, the package consists of one or more growing plants 5 assembled in bunch like groups with their stems 6 of approximately the same length and arranged in substantially parallel relation as shown. The roots 7 are contained in soil, peat moss 8 or other suitable material and the spaces between the several stems are filled or packed with suitable light and fibrous material 9, e. g. fine excelsior, which is of sufficient firmness to sustain the package while in transport or otherwise handled from the time of being put up until ultimate planting.

In making up the package damp peat 8 or other suitable sustaining material is placed about the roots 7 and with the packing or filler substance 9 properly distributed among the stems 6, the whole is rolled with a sheet of waxed or other waterproof paper 10 into cylindrical form. The cylindrical package or bag is then rolled with a paper board or veneer 11, that is over-lapped and sealed as at 12 providing an open ended carton. A suitable paper covering or wrapper 13 is placed on the outside and may have printed thereon the name of variety, planting, and cultural directions, leaving the tops of the plants above the package end exposed to view. In lieu of the paper covering or bag 10 water-proof cloth or sheet rubber may be used.

In making up the package the irrigating or watering device is included. This consists of an open ended tube 14 placed among the stems 6 and wrapped or embodied therewith after the manner shown. Said tube may be an ordinary drinking straw, hollow reed, or of rubber or glass, metal, and in fact the needed purpose would be served regardless of the tube material just so long as it is contained within the package and has its lower or discharge end 15 inserted into the root surrounding soil or peat moss 8, and with its upper end 16 projecting sufficiently above the edge of the carton 11 to be in view at all times and readily reached for conveniently injecting water therein as will be understood. The water may be readily inserted through the tube or pipe by means of an ordinary oil can, medicine dropper, syringe, special hose nozzle, or in fact any device may be employed having a suitable spout or nozzle.

In the construction shown in Figure 3 the package 17 is substantially of box like or rectangular shape, and the several plants 5 therein have their stems 6 passing through the packing material 18 which in this instance is contained within a suitable wrapping 19 that overlies the soil, peat moss or other root enclosing medium 8. In this instance the watering or irrigating tube 15 passes through the packing material 18 and enters the soil 8 for the proper distance after the manner shown and described above.

It will therefore be seen that with these provisions for packing plants, perennials, bulbs, trees, shrubs, rosebushes, etc., the roots may be thoroughly wetted when shipped and by means of the tube 14 the consignee can easily keep the packages well watered as often as necessary to prevent the roots from becoming dry, or the tops from wilting and withering, thus extending the season of display and sale for as long as may be necessary or until all are sold.

It will be further understood the invention as herein disclosed is not limited to the details of construction shown and described, and that these may be varied widely without departing from the spirit of the invention as defined by the claims.

What is claimed as new is:

1. A plant package comprising a growing plant, sustaining soil embedding the roots thereof, a filler substance wrapped about the plant stem, a water-proof container holding said soil and filler substance, a carton enclosing the whole, and a device for injecting water into the roots and sustaining soil, said device being wrapped with the filler substance and extending to the soil, substantially as set forth.

2. A plant package comprising a growing plant, sustaining soil embedding the roots thereof, a moisture retaining filler wrapped around the plant stem, a water-proof container for said filler and the root embedding soil, said soil and filler adapted to be initially wetted, and a tube for admitting water to the roots and embedding soil said tube being wrapped with the filler substance and extending to the soil, substantially as set forth.

3. A plant package comprising a plurality of growing plants, sustaining soil embedding the roots thereof, a moisture retaining filler wrapped around the stems of the plants, a carton enclosing said filler substance and the embedding soil substantially co-extensive in length with the several plants and providing a unitary article and an irrigating tube wrapped with the filler substance and extending to the soil, substantially as set forth.

4. The combination with a plurality of growing plants having stems arranged in close parallel relation and wrapped into a package, of a tube wrapped therewith and through which water may be directed to the plant roots, the lower end of the tube extending into the roots, the body of the tube adjacent the stems of the plants and the upper end thereof projecting appreciably above the end of the package whereby a water pressure device may be readily applied thereto, substantially as set forth.

5. An article of the character described comprising a growing plant, root sustaining material and a superposed moisture retaining substance, a tube lying in intimate contact with the stems of the plants and extending through the moisture retaining substance whereby water may be injected into the plant roots, and a container; the whole constituting a compact and unitary package, substantially as set forth.

CLARK E. GARDNER.